May 29, 1934.  W. THOMPSON  1,960,559
CONTROLLING DEVICE FOR FREEWHEELING CLUTCH LOCK-UP
Filed April 15, 1932
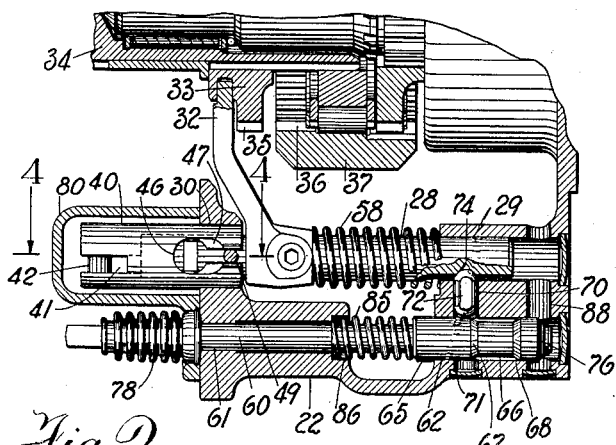
Fig. 2
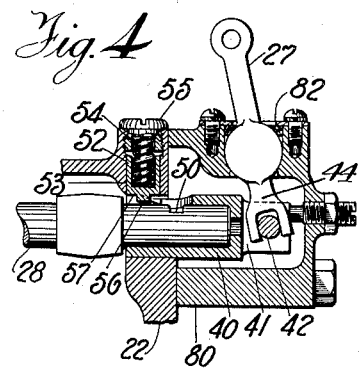
Fig. 4
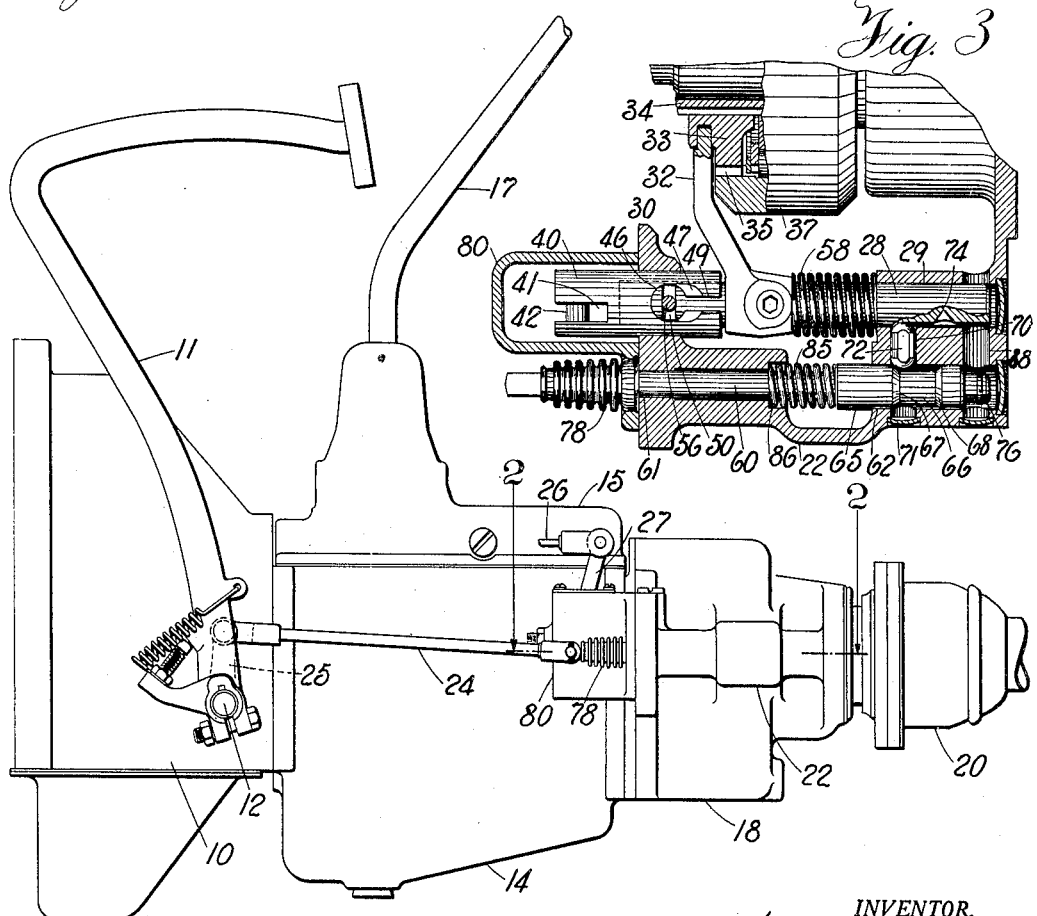
Fig. 3
Fig. 1
INVENTOR.
William Thompson
BY
P. W. Pomroy
ATTORNEYS.

Patented May 29, 1934

1,960,559

UNITED STATES PATENT OFFICE 1,960,559

CONTROLLING DEVICE FOR FREEWHEELING CLUTCH LOCK-UP

William Thompson, South Bend, Ind., assignor, by mesne assignments, to Free Wheeling Patents Corporation, South Bend, Ind., a corporation of Delaware Application April 15, 1932, Serial No. 605,409

18 Claims. (Cl. 192—48)

This invention relates to a controlling device for a free wheeling clutch lock-up and particularly to the mechanism for moving the locking element of the free wheeling or one-way clutch from its operative to its in-operative position and vice versa and to a main engine clutch interlock for preventing movement of the one-way clutch locking element from its in-operative to its operative position, except when the main engine clutch is disengaged, and has for its principal object the provision of a simplified form of mechanism for moving the one-way clutch locking element and providing a main engine clutch interlock therefor.

A further object is the provision, in a mechanism of the character described, of a main engine clutch interlock which is actuated by the axial motion of a rod, disposed parallel to the direction of force exerted upon it by the main engine clutch pedal.

A still further object is the provision of a mechanism of the character described in which the movement of the one-way clutch locking element and the actuation of the main engine clutch interlock is accomplished by two axially movable rods or shafts.

It is also an object to provide a mechanism of the character described which is simple and economical to manufacture, easy to operate and rugged in construction so that it will not readily get out of order in use.

Other objects of the invention will appear as the description proceeds.

The drawing illustrates a preferred mechanical embodiment of the idea of the invention. The drawing, however, is not to be taken as limiting the invention, the scope of which is to be measured entirely by the scope of the subjoined claims.

In the drawing:

Figure 1 is an elevational view of the clutch casing, transmission casing, free wheeling clutch casing and forward universal joint of an automobile showing a free wheeling lock-up mechanism constructed according to the idea of this invention applied to the free wheeling clutch casing and operatively connected with the pedal of the main engine clutch.

Figure 2 is a sectional view on the line 2—2 of Figure 1, showing the actuating mechanism of the free wheeling lock-up and a fragmentary portion of the free wheeling clutch, and showing the locking element of the free wheeling clutch in in-operative position.

Figure 3 is a sectional view similar to Figure 2 showing the locking element of the free wheeling clutch in operative position.

Figure 4 is a sectional view on the line 4—4 of Figure 2, looking in the direction of the arrows.

Referring to the drawing in detail, and particularly to Figure 1, the numeral 10 indicates the rear part of an internal combustion engine, this part being formed as a casing in which the engine main clutch is housed and upon which the clutch pedal 11 is operatively mounted by means of the shaft 12. 14 indicates the casing of the vehicle transmission which is provided with a cover 15 from which projects the gear shift lever 17. 18 indicates the casing of the one-way or free wheeling clutch mounted at the rear of the transmission and 20 indicates the universal joint connection between the driven shaft of the free wheeling clutch and the propeller shaft of the vehicle.

Mounted upon the casing 18 of the free wheeling clutch is a casing 22 which contains mechanism for rendering the free wheeling clutch operative or in-operative to provide a one-way or a conventional drive for the vehicle. This mechanism is connected to the clutch pedal of the main engine clutch my means of a pivoted link 24 and an arm 25 non-rotatably mounted upon the shaft 12 of the main engine clutch. This mechanism is also connected with a manual control lever, not shown, by means of a cable 26 and a pivoted lever 27.

Referring to Figure 2, it will be observed that the mechanism for rendering the one-way or free wheeling clutch operative or in-operative comprises, a shaft 28 axially slidable in bearings 29 and 30 provided in the casing 22. A shifter fork 32 is rigidly mounted upon the shaft 28 and operatively engages a locking element 33 which is slidably but non-rotatably mounted upon the transmission shaft 34. This locking element 33 has two operative positions illustrated in Figures 2 and 3 respectively. In the position illustrated in Figure 2, the locking element 33 is clear of the free wheeling clutch and in this position of the locking element a free-wheeling or one-way drive is provided through the one-way clutch for the transmission shaft 34 to the propeller shaft of the vehicle. In the other operative position of the element 33, this locking element is moved along the shaft 34 until peripheral clutch teeth 35 on the element 33 mesh with internal clutch teeth 36 formed in one end of the exterior clutch element 37 of the free wheeling clutch, thereby locking the element 37 with relation to the shaft 34 in both directions of rotation. It will be observed that this locking and releasing of the free wheeling clutch is accomplished by axial movement of the shaft 28 with the consequent movement of the shifter fork 32 and the locking element 33.

Movement of the element 33 from its operative to its in-operative position to change the drive from conventional to free wheeling may be accomplished without disadvantage, regardless of whether the main engine clutch is engaged and the engine is driving the vehicle or whether the main engine clutch is disengaged. It is not desirable, however, to move the locking element from its operative to its in-operative position when the vehicle is coasting and driving the engine, nor is it desirable to move the locking element 33 from its in-operative to its operative position except when the main engine clutch is disengaged. In order to overcome the difficulties described above, an automatic release is provided for moving the locking element from operative to in-operative position which comprises a tension spring which may be loaded at any time but which will act to move the locking element only when driving conditions are such that no injury to the mechanism will result, and an interlock between the locking element actuating mechanism and the main engine clutch which will permit movement of the locking element from its in-operative to its operative position only when the main engine clutch is disengaged.

A sleeve 40 having an axial bore extending part of the way therethrough is mounted upon the forward end of the shaft 28 in telescopic relation therewith. This sleeve is provided in the forward end thereof with a transverse slot 41 and a cylindrical bearing member 42 extending across the slot. As illustrated in Figure 4, the manually actuated lever 27 is pivotally supported intermediate its length by the casing 22 and at its lower end is provided with a yoke 44 which operatively engages the bearing member 42 whereby the sleeve member 40 may be moved axially through the bearing 30 upon actuation of the lever 27. This sleeve 40 is also provided with an aperture 46 extending from the exterior thereof into the axial bore and is further provided with tapered cam portions 47 lying upon each side of a groove 49 which extends from the aperture 46 to the rear end of the sleeve member 40. This aperture 46 is provided in the top surface of the sleeve 40 and a notch 50 is provided in the top surface of the end of the shaft 28 which projects into the bore in the sleeve 40. A spring pressed detent 52 adapted to register with the aperture 46 and the notch 50 in certain positions of the sleeve 40 and the shaft 28 is slidably mounted in an aperture 53 provided in the casing 22 adjacent to the bearing 30. This detent 52 is urged into engagement with the notch 50 by a coiled compression spring 54 which is maintained under compression in the aperture 53 by means of a screw cap 55 threaded into the outer end of the aperture. The detent 52 is provided with a depending lug 56 surrounded by a flat surface 57 against which the cam 47 is adapted to bear. A coil spring 58 is mounted surrounding the shaft 28 between the shoulder of the bearing 29 and a shoulder provided on the shifter fork 32 to urge the shaft 28 and the shifter fork 32 in a direction to move the locking element 33 out of engagement with the clutch element 37.

A second shaft 60 is slidably mounted in bearings 61 and 62 in the casing 22 in parallel relation to the shaft 28. A sleeve 65 is slidably mounted upon the shaft 60 upon the end of the shaft remote from the sleeve 40. This sleeve 65 is provided intermediate its length with an annular portion 66 of less diameter than the remainder of the sleeve, and the reduced portion 66 is connected to the end portions of the sleeve by means of offset, tapering or cam portions 67 and 68. The casing 22 is provided in the end containing the bearings 29 and 62 with a well or bore 70 extending from the outside of the casing at 71 into the bearing 29. A detent 72 having rounded ends is slidably mounted in the bore 70 between the sleeve 65 and the end of the shaft 28, and the shaft 28 is provided in the end received in the bearing 29 with a notch 74 in which one end of the detent 72 is adapted to engage when the shaft 28 is in such an axial location that the notch 74 registers with the bore 70. The end of the detent 72 opposite the shaft 28 rests against the sleeve 65 and the detent is forced into engagement with the notch 74 whenever the end of the detent in contact with the sleeve 65 rests upon the enlarged portion of the sleeve. Whenever the end of the detent rests upon the reduced portion 66 of the sleeve 65, the detent is released from locking engagement in the notch 74 of the shaft 28. The shaft 60 slides freely through the sleeve 65 and is provided at its rear end with a fixed washer 76 for moving the sleeve 65 from the position shown in Figure 2 to the position shown in Figure 3 upon axial motion of the shaft 60. At its forward end the shaft 60 is provided with an eye by means of which it is connected with the pedal of the main engine clutch through the rod 24. A dust seal 78 is provided between the projecting end of the shaft 60 and the casing 22 and a dust-tight cap 80 is mounted over the projecting end of the sleeve 40 and carries the pivoted lever 27, a dust-tight seal 82 being provided between the lever 27 and the cap 80. A coiled compression spring 85 surrounds the shaft 60 between the forward end of the sleeve 65 and a shoulder 86 provided in the casing 22. A bore 88 is provided in the casing 22 extending through the bearings 29 and 62 immediately rearward of the rear end of the shafts 28 and 60 to prevent oil or air from being compressed in these bearing apertures by the rear ends of the respective shafts, thereby preventing the shafts from moving rearwardly in the bearing apertures.

The operation of the device is as follows:

First considering that the vehicle is in free wheeling drive as illustrated in Figure 2, and the operator wishes to place it in positive or conventional drive. The operator must first depress the main engine clutch pedal, thereby moving the shaft 60 and the sleeve 65 axially forward to release the detent 72 from engagement in the notch 74. The manual control may then be actuated to move the lever 27 to force the sleeve 40 and the shaft 28 together with the shifter fork 32 and locking element 33 rearwardly to the position illustrated in Figure 3. Upon re-engaging the main engine clutch, the vehicle will now be in positive or conventional drive, and will be maintained therein by engagement of the lug 56 on the detent 52 in the notch 50 in shaft 28.

Next assuming that the vehicle is in conventional drive as illustrated in Figure 3, and the operator wishes to change to free wheeling drive as illustrated in Figure 2. The manual control may be actuated to move the lever 27 to carry the sleeve 40 forwardly. As the sleeve 40 moves forwardly, the cam portion 47 will ride under the detent 52 and remove the lug 56 from engagement in the notch 50. As the coiled spring 58 is loaded when the vehicle is in positive or conventional drive as illustrated in Figure 3, the tension of the spring will tend to move the shifter fork 32 and the locking element 33 forwardly immediately upon release of the detent 52. However, if at this time the vehicle is tending to overrun the engine and the engine is acting as a brake, the pressure between the teeth 35 and 36 will prevent movement of the locking element 33 relative to the clutch element 37. As soon, however, as the engine starts to drive the vehicle, this tooth pressure will be released and the spring 58 will immediately force the shifter fork 32 and the locking element 33 forwardly, placing the vehicle in free wheeling drive as illustrated in Figure 2. At the same time, the notch 74 will come into alignment with the bore 70 and the detent 72 will move into engagement with the notch permitting the sleeve 65 to move rearwardly under the force of the loaded coiled spring 85 to lock the mechanism in free wheeling drive. The drive cannot now be changed to conventional or positive without first depressing the vehicle clutch actuating member.

Having now described my invention and the principal objects and advantages thereof, so that others skilled in the art may clearly understand the same, what I desire to secure by Letters Patent is as follows.

What I claim:

1. In a vehicle having an internal combustion engine, an engine clutch, a free-wheeling clutch, and a positive lock-up for said free-wheeling clutch, controlling means for said free-wheeling clutch lock-up comprising, a shaft, means carried by said shaft operatively engageable with the locking element of said free-wheeling clutch, manually actuated means to move said shaft to engage said locking element with said clutch, a detent engageable with said shaft to lock the same in position to maintain said locking element out of engagement with said clutch, and means operatively connected with the engine clutch actuating means to release said detent when said engine clutch is released.

2. In a vehicle having an internal combustion engine, an engine clutch, a free-wheeling clutch, and a positive lock-up for said free-wheeling clutch, controlling means for said free-wheeling clutch lock-up comprising, an axially movable shaft, means carried by said shaft operatively engageable with the locking element of said free-wheeling clutch, manually actuated means to move said shaft whereby said locking element will engage said clutch, means operatively connected with the engine clutch actuating means and engageable with said shaft to prevent movement of said shaft to engage said locking element with said free-wheeling clutch except when said engine clutch is released, a detent to lock said shaft in position to maintain said locking element in engagement with said clutch, said manually actuated means being operable to release said detent, and means to move said shaft to release said locking element from said clutch upon release of said detent locking means.

3. In a vehicle having an internal combustion engine, an engine clutch, a free-wheeling clutch, and a positive lock-up for said free-wheeling clutch, controlling means for said free-wheeling clutch lock-up comprising, an axially movable shaft, means carried by said shaft operatively engageable with the locking element of said free-wheeling clutch, manual actuating means for said shaft, a sleeve slidably mounted upon one end of said shaft operatively connected to said manual means to move said shaft to cause said locking element to engage said clutch, means operatively connected with the engine clutch actuating means and engageable with said shaft to prevent movement of said shaft to cause said locking element to engage said free-wheeling clutch except when said engine clutch is released, a spring pressed detent for locking said shaft in position to maintain said locking element in engagement with said free-wheeling clutch, a cam on said sleeve for releasing said detent from engagement with said shaft, and means for moving said shaft to release said locking element from said free-wheeling clutch upon disengagement of said detent from said shaft.

4. In a vehicle having an internal combustion engine, an engine clutch, a free-wheeling clutch, and a positive lock-up for said free-wheeling clutch, controlling means for said free-wheeling clutch lock-up comprising, an axially movable shaft, means carried by said shaft operatively engageable with the locking element of said free-wheeling clutch, manually actuated means to move said shaft whereby said locking element will engage said clutch, a second axially movable shaft parallel to said first shaft operatively connected with the engine clutch actuating means, a notch in said first shaft, a detent between said two shafts, means upon said second shaft for causing said detent to engage in said notch to prevent movement of said first shaft to cause said locking element to engage said free wheeling clutch except when said detent is released by movement of said second shaft upon release of said engine clutch, means for locking said first shaft in position to maintain said locking element in engagement with said free wheeling clutch, means to release said last named shaft locking means upon movement of said manually actuated control, and means to move said shaft to release said locking element from said free-wheeling clutch upon release of said shaft locking means.

5. In a vehicle having an internal combustion engine, an engine clutch, a free-wheeling clutch, and a positive lock-up for said free-wheeling clutch, controlling means for said free-wheeling clutch lock-up comprising, an axially movable member, means carried by said member operatively engageable with the locking element of said free-wheeling clutch, two locking means alternatively operable to lock said axially movable member against axial motion, manually actuated means for releasing one of said locking means, and means operatively connected with the engine clutch actuating means for actuating the other of said locking means.

6. In a vehicle having an internal combustion engine, an engine clutch, a free-wheeling clutch, and a positive lock-up for said free-wheeling clutch, controlling means for said free-wheeling clutch lock-up comprising, an axially movable shaft, means carried by said shaft operatively engageable with the locking element of said free-wheeling clutch, resilient means urging said shaft in one direction, shaft locking means for holding said shaft against the action of said resilient means, manually actuated means for releasing said locking means and for moving said shaft in a direction against the action of said resilient means, a second shaft locking means for holding said shaft against the action of said manually actuated means, and means operatively connected with the engine clutch actuating means for actuating said second shaft locking means to release said shaft when said engine clutch is disengaged.

7. In a vehicle having an internal combustion engine, an engine clutch, a free-wheeling clutch, and a positive lock-up for said free-wheeling clutch, controlling means for said free-wheeling clutch lock-up comprising, a casing, a shaft movably mounted in bearings formed in said casing, means carried by said shaft operatively engageable with the locking element of said free-wheeling clutch, resilient means urging said shaft in a direction to move said locking element out of engagement with said free-wheeling clutch, shaft locking means for holding said shaft against the action of said resilient means, manually actuated means for releasing said shaft locking means and for moving said shaft in a direction to cause said locking element to lock said free-wheeling clutch, a second shaft locking means operative to hold said shaft against the action of said manually actuated means, a second shaft movably mounted in said casing and operatively connected with the engine clutch actuating means operative to cause said second shaft locking means to release said first mentioned shaft when the engine clutch is disengaged, and resilient means operative to cause said second shaft locking means to hold said first mentioned shaft against action of said manually actuated means to engage said locking element with said free-wheeling clutch when the engine clutch is engaged.

8. In a vehicle having an internal combustion engine, an engine clutch, a free-wheeling clutch, and a positive lock-up for said free-wheeling clutch, controlling means for said free-wheeling clutch lock-up comprising, a casing, a shaft movably mounted in said casing, means carried by said shaft operatively engageable with the locking element of said free-wheeling clutch, resilient means urging said shaft in a direction to move said locking element out of engagement with said free-wheeling clutch, locking means for holding said shaft against the action of said resilient means, manually actuated means for releasing said shaft locking means and for moving said shaft in a direction to cause said locking element to engage with said free-wheeling clutch, a second shaft locking means operative to hold said shaft against the action of said manually actuated means, a second shaft slidably mounted in said casing and operatively connected with the engine clutch actuating means, means on said second shaft to actuate said second shaft locking means, an abutment on said second shaft for moving said actuating means in one direction, and spring means for urging said actuating means in the opposite direction.

9. In a vehicle having an internal combustion engine, an engine clutch, a free-wheeling clutch, and a positive lock-up for said free-wheeling clutch, controlling means for said free-wheeling clutch lock-up comprising, a casing, a shaft mounted for axial movement in said casing, means carried by said shaft operatively engageable with the locking element of said free-wheeling clutch, spring means urging said shaft in a direction to move said locking element out of engagement with said free-wheeling clutch, shaft locking means for holding said shaft against the action of said spring means, a manually actuated sleeve for moving said shaft in a direction to move said locking element into engagement with said free-wheeling clutch and for releasing said shaft locking means, a second shaft locking means operative to hold said shaft against the action of said manually actuated sleeve, and means operatively connected with the engine clutch actuating means to cause said second shaft locking means to prevent motion of said shaft to move said locking element into engagement with said free-wheeling clutch except when said engine clutch is disengaged.

10. In a vehicle having an internal combustion engine, an engine clutch, a free-wheeling clutch, and a positive lock-up for said free-wheeling clutch, controlling means for said free-wheeling clutch lock-up comprising, a casing, a shaft mounted for axial movement in said casing, means carried by said shaft operatively engageable with the locking element of said free-wheeling clutch, spring means urging said shaft in a direction to move said locking element out of engagement with said free-wheeling clutch, shaft locking means for holding said shaft against the action of said spring means, a manually actuated sleeve for moving said shaft in a direction to move said locking element into engagement with said free-wheeling clutch and for releasing said shaft locking means to permit said spring means to move said shaft in a direction to disengage said locking element from said free-wheeling clutch, a second shaft locking means operative to hold said shaft against the action of said manually actuated sleeve, and a second shaft operatively connected to the engine clutch actuating means to cause said second shaft locking means to prevent motion of said first mentioned shaft to move said locking element into engagement with said free-wheeling clutch when the engine clutch is engaged and to cause said second shaft locking means to permit said motion of said first mentioned shaft when said engine clutch is disengaged.

11. In a vehicle having an internal combustion engine, an engine clutch, a free-wheeling clutch, and a positive lock-up for said free-wheeling clutch, controlling means for said free-wheeling clutch lock-up comprising, a casing, an axially movable shaft having a notch adjacent to each end thereof mounted in said casing, means carried by said shaft operatively engageable with the locking element of said free-wheeling clutch, a spring urging said shaft in a direction to move said locking element out of engagement with said free-wheeling clutch, a sleeve slidably mounted on one end of said shaft manually actuated to move said shaft in a direction to cause said locking element to engage said free-wheeling clutch, a spring pressed detent engageable with one of the notches in said shaft, a cam on said sleeve for moving said detent out of engagement with said notch upon manual actuation of said sleeve whereby said spring will move said shaft to cause said locking element to move out of engagement with said free-wheeling clutch, a second axially movable shaft mounted in said casing parallel to said first mentioned shaft operatively connected with the engine clutch actuating means, a sleeve having a reduced portion and a cam surface slidably mounted on said second shaft, a detent slidably mounted in said casing between said first mentioned shaft and said last mentioned sleeve actuated by said sleeve into engagement with the other notch in said shaft when said locking element is out of engagement with said free-wheeling clutch to prevent movement of said shaft to cause said locking element to engage with said free-wheeling clutch, said sleeve being actuated by disengagement of said engine clutch to bring the reduced portion of said sleeve into alignment with said detent to release said detent from engagement in the notch in said first mentioned shaft, an abutment on the end of said last-mentioned shaft for moving the sleeve on said shaft into position to release said detent upon disengagement of the engine clutch and a spring between said sleeve and a shoulder on said casing for urging said sleeve into a position to cause said detent to engage in the notch in said first mentioned shaft.

12. Controlling means for a free wheeling unit having lock-up elements comprising, an axially movable shaft, means carried by said shaft operatively engageable with one of said lock-up elements, a sleeve telescoping an end of said shaft, and means to move said shaft and sleeve to engage said lock-up elements, said sleeve and shaft being axially movable relative to each other to permit disengagement of said lock-up elements.

13. Controlling means for a free wheeling unit having lock-up elements comprising, an axially movable shaft, means carried by said shaft operatively engageable with one of said lock-up elements, a sleeve telescoping an end of said shaft, and means to move said shaft and sleeve as a unit to engage said lock-up elements, said sleeve and shaft being axially movable relative to each other to permit disengagement of said lock-up elements.

14. Controlling means for a free wheeling unit having lock-up elements comprising, an axially movable shaft, means carried by said shaft operatively engageable with one of said lock-up elements, a member engageable with said shaft, and means to move said shaft and member as a unit to engage said lock-up elements, said shaft and member being axially movable relative to each other to permit disengagement of said lock-up elements.

15. Controlling means for a free wheeling unit having lock-up elements comprising, a plurality of axially movable members, means carried by one of said members operatively engageable with one of said lock-up elements, means to move said members axially to engage said lock-up elements, means to maintain said lock-up elements in engaged position against accidental disengagement, and means to disengage said lock-up elements, one of said members being movable to render said third-named means inoperative before operation of said last-named means.

16. Controlling means for a free wheeling unit having lock-up elements comprising, a plurality of axially movable members, means carried by one of said members operatively engageable with one of said lock-up elements, manually controlled means to move said members axially to engage said lock-up elements, means to maintain said lock-up elements in engaged position against accidental disengagement, and a spring to disengage said lock-up elements, one of said members being movable to render said last-named means inoperative before actuating of said spring to disengage said lock-up elements.

17. Controlling means for a free wheeling unit having lock-up elements comprising, a plurality of axially movable members, means carried by one of said members operatively engageable with one of said lock-up elements, manually controlled means to move said members axially to engage said lock-up elements, a detent engageable with one of said members to maintain said lock-up elements in engaged position against accidental disengagement, and a spring to disengage said lock-up elements, one of said members being movable to render said detent inoperative before actuating of said spring to disengage said lock-up elements.

18. Controlling means for a free wheeling unit having lock-up elements comprising, a plurality of axially movable members, means carried by one of said members operatively engageable with one of said lock-up elements, manually controlled means to move said members axially to engage said lock-up elements, a detent engageable with one of said members to maintain said lock-up elements in engaged position against accidental disengagement, a spring to disengage said lock-up elements, and a cam on the other of said members to release said detent before actuation of said spring to disengage said lock-up elements.

WILLIAM THOMPSON.